United States Patent [19]

Daniels

[11] 3,912,727

[45] Oct. 14, 1975

[54] PREPARATION OF PHENOTHIAZINES
[75] Inventor: David A. Daniels, Kendall Park, N.J.
[73] Assignee: W. R. Grace & Co., New York, N.Y.
[22] Filed: July 16, 1973
[21] Appl. No.: 379,834

Related U.S. Application Data

[60] Continuation-in-part of Ser. No. 308,890, Nov. 22, 1972, abandoned, which is a division of Ser. No. 152,372, June 11, 1971, abandoned.

[52] U.S. Cl...... 260/243 A; 252/402; 260/45.8 SN; 260/814
[51] Int. Cl.² ...................................... C07D 279/36
[58] Field of Search............................ 260/243, 45.8

[56] References Cited
UNITED STATES PATENTS

| | | | |
|---|---|---|---|
| 3,100,772 | 8/1963 | Kantor et al. | 260/243 |
| 3,261,867 | 7/1966 | Fryer et al. | 260/570 |
| 3,344,068 | 9/1967 | Waight et al. | 252/47 |
| 3,494,885 | 2/1970 | Thompson et al. | 260/45.8 |

FOREIGN PATENTS OR APPLICATIONS

| | | | |
|---|---|---|---|
| 873,066 | 7/1961 | United Kingdom | 260/243 |

*Primary Examiner*—Harry I. Moatz
*Attorney, Agent, or Firm*—Elton Fisher

[57] ABSTRACT

A phenothiazine which is a tertiary aromatic amine is prepared by; (a) forming a first mixture by admixing dimethylsulfoxide (DMSO) and sodium hydride; (b) forming a second mixture by admixing a phenothiazine which is a secondary aromatic amine and the first mixture; (c) forming the phenothiazine which is a tertiary aromatic amine by admixing the second mixture and an aralkyl halide (e.g., benzyl chloride, benzyl bromide, or the like); and (d) separating and recovering the tertiary aromatic amine.

13 Claims, No Drawings

PREPARATION OF PHENOTHIAZINES

CROSS REFERENCE TO RELATED APPLICATION

This is a continuation-in-part of copending application Ser. No. 308,890 filed Nov. 22, 1972 which is now abandoned and which was in turn a divisional of copending application Ser. No. 152,372 filed June 11, 1971, and now abandoned.

BACKGROUND OF THE INVENTION

This invention is in the field of phenothiazines which are tertiary aromatic amines. More particularly, this invention is directed to phenothiazines which are useful as antioxidants and to a method for preparing such amines.

Such phenothiazine (which is a tertiary amine) is prepared by a process comprising; (a) forming a fist mixture by admixing dimethylsulfoxide (DMSO) and sodium hydride; (b) forming a second mixture by admixing a phenothiazine which is a secondary aromatic amine (i.e., the phenothiazine which is a secondary amine has a hydrogen in the "10" position) and the first mixture; (c) forming the phenothiazine which is a tertiary aromatic amine by admixing an aralkyl halide (e.g., benzyl chloride, benzyl bromide, benzyl iodide or the like); and (d) separation and recovering the tertiary aromatic amine.

U.S. Pat. No. 3,288,860 (Lyness et al, 260/607) teaches that organic halides (except fluorides) having the formula $RCH_2X$ where R is hydrogen, alkyl, or aryl and X is bromine, chlorine, or iodine will react with DMSO that has been treated with sodium hydride to form $CH_3SOCH_2CH_2R$ and NaX, thereby to lead away from the use of DMSO as reaction medium in the method of the instant invention and render said method completely unobvious.

SUMMARY OF THE INVENTION

In summary this invention is directed to a process for replacing hydrogen attached to nitrogen in the 10 position of a first phenothiazine, said first phenothiazine having hydrogen attached to the nitrogen in the 10 position, with an aralkyl group to form a second phenothiazine having the aralkyl group attached to the nitrogen in the 10 position, the process comprising the following sequential steps:

a. forming a first mixture by admixing dimethylsulfoxide and an alkali metal hydride;
b. forming a second mixture by admixing the first phenothiazine and the first mixture;
c. forming the second phenothiazine by admixing an aralkyl halide having the formula

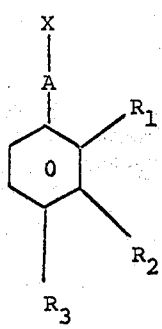

in which (i) X is I, Br, or Cl; (ii) A is $Cl_2$, $CBr_2$, $CCl_2$, or an alkylene group having 1-7 carbon atoms; and (iii) $R_1$, R, and $R_3$ are separately selected from the group consisting of $CH_3$, $C_2H_5$, iodine, bromine, chlorine, fluorine, nitro, and hydrogen; and d. separating and recovering the second phenothiazine, the dimethylsulfoxide, the alkali metal hydride, the first phenothiazine, and the aralkyl halide each being supplied in an amount effective for forming the second phenothiazine.

DESCRIPTION OF PREFERRED EMBODIMENTS

In preferred embodiments of the process (or method) of the above Summary:

1. The first phenothiazine has the formula

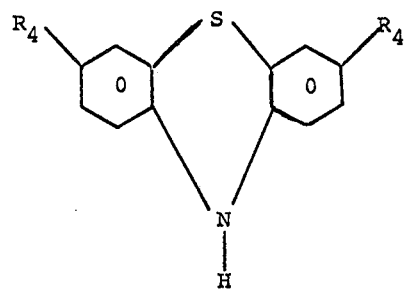

2. The second phenothiazine has the formula

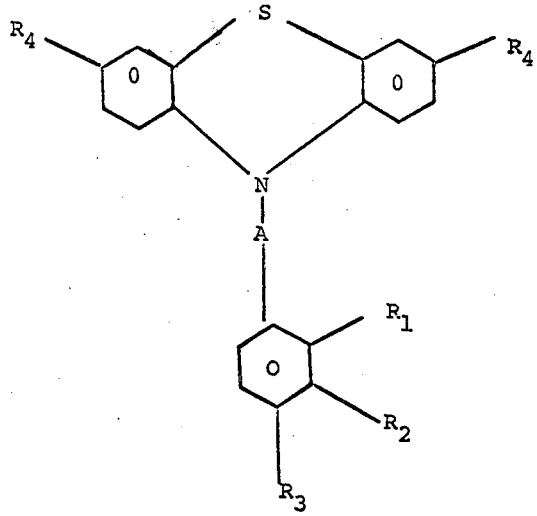

in which $R_1$, $R_2$, and $R_3$ are separately elected from the group consisting of $CH_3$, $C_2H_5$, iodine, bromine, chlorine, fluorine, nitro, and hydrogen; A is $Cl_2$, $CBr_2$, $CCl_2$ or an alkylene group having about 1–7 carbon atoms; and $R_4$ is $C(CH_3)_3CH_2C(CH_3)_2$.

In another preferred embodiment ("Embodiment A") this invention is directed to a phenothiazine having the formula

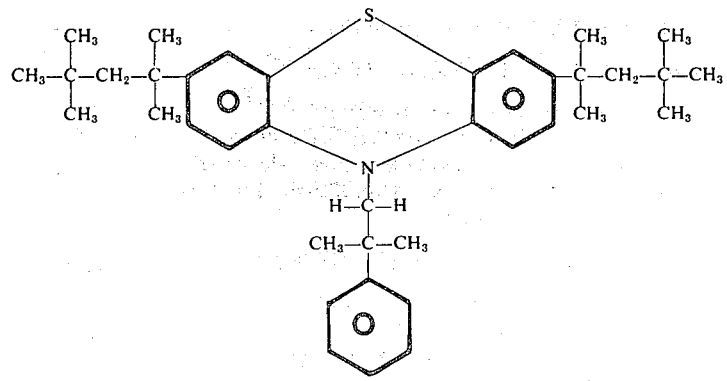

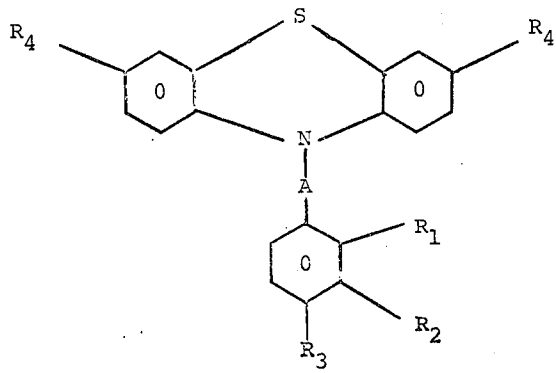

in which $R_4$ is $C(CH_3)_3CH_2C(CH_3)_2$; A is $Cl_2$, $CBr_2$, $CCl_2$ or an alkylene group having about 1-7 carbon atoms; and $R_1$, $R_2$, and $R_3$ are separately selected from the group consisting of $CH_3$, $C_2H_5$, iodine, bromine, chlorine, fluorine, nitro, and hydrogen provided that at least one of $R_1$, $R_2$, and $R_3$ is not hydrogen.

In especially preferred embodiments of my invention as recited in Embodiment A, supra:

1. $R_1$ is $CH_3$, Cl, F, or $NO_2$; $R_2$ and $R_2$ are hydrogen; and A is $CH_2$.
2. $R_3$ is $CH_3$, Cl, F, or $NO_2$; $R_1$ and $R_2$ are hydrogen; and A is $CH_2$.
3. $R_2$ and $R_3$ are Cl; $R_1$ is hydrogen; and A is $CH_2$.
4. $R_1$ and $R_3$ are Cl; $R_2$ is hydrogen; and A is $CH_2$.

In another preferred embodiment ("Embodiment B") this invention is directed to a phenothiazine having the formula

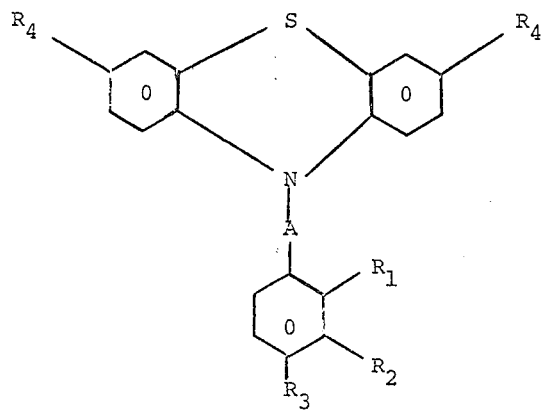

in which $R_1$, $R_2$, and $R_3$ are separately selected from the group consisting of $CH_3$, $C_2H_5$, iodine, bromine, chlorine, fluorine, nitro, and hydrogen; $R_4$ is $C(CH_3)_3CH_2C(CH_3)_2$; and A is $Cl_2$, $CBr_2$, $CCl_2$ or an alkylene group having 2-7 carbon atoms.

In especially preferred embodiments of my invention as recited in embodiment B, supra.

1. $R_1$, $R_2$, and $R_3$ are hydrogen; and A is $CCl_2$.
2. The formula of the phenothiazine is

DETAILED DESCRIPTION OF THE INVENTION

The use of certain phenothiazines as antioxidants is well-known. In particular, the use of antioxidants in the plastics and rubber industries is of great importance. Unfortunately, oxidation of plastics and rubbers at high temperatures to render the oxidized plastics and rubbers useless is a serious problem. In general, as the temperatures under which plastics and rubbers are used has risen, it has become increasingly difficult to find an antioxidant which can function properly and resist oxidation. Recently it has become known that certain phenothiazines provide the necessary qualities of an antioxidant. More particularly, it has now become known that phenothiazines useful as antioxidants can be produced by the method of this invention which uses a phenothiazine having a hydrogen in the 10 position (such phenothiazine being a secondary amine) as a starting material.

The phenothiazines of this invention (such phenothiazines being tertiary amines since they have an aralkyl group (rather than hydrogen) in the 10 position, have been used with excellent results to improve oxidative stability of ester base lubricants at temperatures up to at least 400°F. Such use of these tertiary amines is described in copending U.S. Pat. application Ser. No. 152,435 filed June 11, 1973 and in copending U.S. Pat. application Ser. No. 379,821, filed July 16, 1973, both of said U.S. patent applications are assigned to W. R. Grace & Co.

It is therefore an object of this invention to prepare a phenothiazine which is a tertiary amine useful as an antioxidant which can be prepared in a pure state and in good yield. It is a further object to prepare such phenothiazine wherein at least one of the members attached to the nitrogen is substituted with a halo, nitro, hydroxy, alkyl or the like group or groups. It is a further object to provide an antioxidant which is stable over extended periods of time at high temperatures, e.g., temperatures up to 500°F. A still further object is to provide a process for preparing the anti-oxidants of this invention.

Broadly speaking, I have found that the phenothiazine of this invention can be prepared in excellent yield and in a pure or substantially pure state by reacting a phenothiazine having the formula

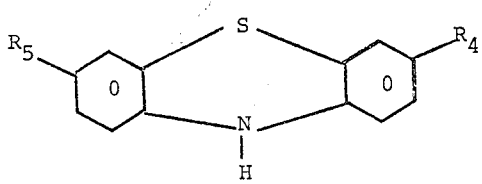

in which $R_4$ and $R_5$ are alkyl group having 1 to 12 carbon atoms preferably alkyl groups having 8 carbon atoms and more preferably an 8 carbon atom alkyl group having the formula $C(CH_3)_2CH_2C(CH_3)_3$ or $CH_2C(CH_3)_2C(CH_3)_3$ with an aralkyl halide having the formula

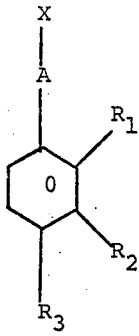

in which X is Cl, Br, or I; A is $CCl_2$, $CBr_2$, $CI_2$, or an alkylene group having 1–7 carbon atoms; and $R_1$, $R_2$, and $R_3$ are separately selected from the group consisting of $CH_3$, $C_2H_5$, iodine, bromine, chlorine, fluorine, nitro and hydrogen.

The phenothiazine of this invention (which is a tertiary amine) has the formula

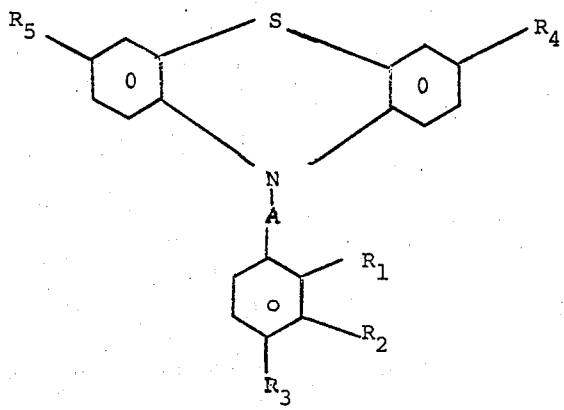

in which $R_4$ and $R_5$ are alkyl groups having 1–12 carbon atoms (preferably alkyl groups having 8 carbon atoms and more preferably 8 carbon atom alkyl groups having the formula $C(CH_3)_2CH_2C(CH_3)_3$ or $CH_2C(CH_3)_2C(CH_3)_3$; $R_1$, $R_2$, and $R_3$ are separately selected from the group consisting of $CH_3$, $C_2H_5$, iodine, bromine, chlorine, fluorine, nitro and hydrogen; and A is $CCl_2$, or $CBr_2$, or an alkylene group having about 1–7 carbon atoms.

In a preferred embodiment of this invention the aralkyl halide compound which is used in this invention is benzyl chloride a substituted benzyl chloride or an aralkyl halide having the following general formula:

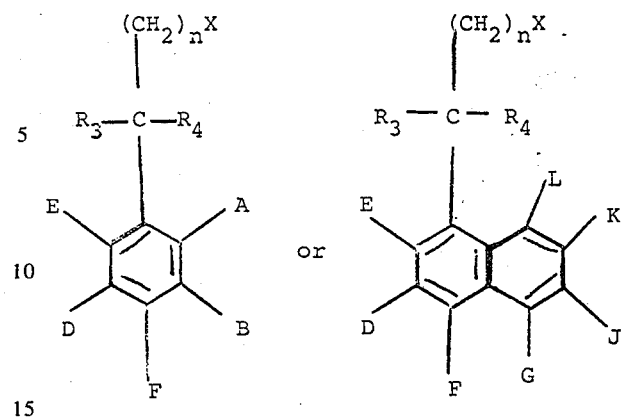

wherein $n$ is an integer in the range of 0–6, A, B, F, D, G, K, L, J, and E are members of the group selected from hydrogen, halo, nitro, hydroxy, alkyl, aryl, and alkoxy groups, X is either chorine or bromine, $R_3$ is either hydrogen or a methyl group, and $R_4$ is either hydrogen or a methyl group. Preferably the alkyl and alkoxy groups have 1–12 carbon atoms, and the aryl groups have 6–10 carbon atoms.

Typical phenothiazines (which are tertiary amines) which make excellent antioxidants and which have been prepared by the process of this invention include those listed in Table 1.

TABLE I (1) N-benzyl-3,7-(1,1,3,3-tetramethylbutyl)-phenothiazine
(2) N-(2-methylbenzyl)-3,7-(1,1,3,3-tetramethylbutyl)-phenothiazine
(3) N-(4-methylbenzyl)-3,7-(1,1,3,3-tetramethylbutyl)-phenothiazine
(4) N-(2-chlorobenzyl)-3,7-(1,1,3,3-tetramethylbutyl)-phenothiazine
(5) N-(4-chlorobenzyl)-3,7-(1,1,3,3-tetramethylbutyl)-phenothiazine
(6) N-(2,4-dichlorobenzyl)-3,7-(1,1,3,3-tetramethylbutyl)-phenothiazine
(7) N-(3,4-dichlorobenzyl)-3,7-(1,1,3,3-tetramethylbutyl)-phenothiazine
(8) N-($\alpha,\alpha$-dichlorobenzyl)-3,7-(1,1,3,3-tetramethylbutyl)-phenothiazine
(9) N-(2-fluorobenzyl)-3,7-(1,1,3,3-tetramethylbutyl)-phenothiazine
(10) N-(4-fluorobenzyl)-3,7-(1,1,3,3-tetramethylbutyl)-phenothiazine
(11) N-(2-nitrobenzyl)-3,7-(1,1,3,3-tetramethylbutyl)-phenothiazine
(12) N-(4-nitrobenzyl)-3,7-(1,1,3,3-tetramethylbutyl)-phenothiazine
(13) N-(2,2-dimethyl-2-phenylethyl)-3,7-(1,1,3,3-tetramethylbutyl)-phenothiazine In the process of this invention it is important that:

1. The first mixture of the above Summary be formed by admixing dimethylsulfoxide and the alkali metal hydride.
2. The phenothiazine which is secondary amine (and not the aralkyl halide) be admixed with the first mixture of said Summary to form the second mixture of said Summary.

3. The aralkyl halide be added to the second mixture (and not to the first mixture) of said Summary.

In other words, it is important that the sequential steps of the process of this invention, as recited in the above Summary, be followed closely to obtain the product phenothiazine which is a tertiary amine in high yield and in excellent quality (high purity).

In the process of this invention the relative amounts of the reactants (phenothiazine which is a secondary amine (i.e., has a hydrogen attached to the nitrogen in the 10 position), alkali metal hydride, and alkaryl halide) used are not critical. However, it is understood that the amounts of such reactants (and the amount of DMSO solvent used) must be amounts effective for forming the product phenothiazine (i.e., the phenothiazine which has an aralkyl group (rather than a hydrogen) attached to the nitrogen in the 10 position and which is therefore a tertiary amine. For reasons of economics and managerial accounting, it is generally preferred that a slight excess (e.g. up to about 5–12 percent over stoichiometric) of alkali metal hydride be used and that about stoichiometric amounts of the phenothiazine which is a secondary amine and the aralkyl halide be used.

More particularly the process of this invention which should be followed to obtain optimum results is as follows: Dimethylsulfoxide (DMSO) is heated to a temperature of about 60°C. To this is added the sodium hydride. In many of my runs a 60 percent by weight dispersion of sodium hydride in mineral oil was used since it is a common way of obtaining sodium hydride commercially. The amount of dimethylsulfoxide used in the reaction is dependent on the molecular weight of the phenothiazine which is a secondary aromatic amine. A 1:1 mole ratio gives excellent results, but about 1.5 mole of DMSO per mole of phenothiazine which is a secondary aromatic amine is generally used to assure complete reaction. Following the addition of the sodium hydride the solution generally turns slightly orange and hydrogen is evolved. After all gas evolution has stopped, the reaction mixture is stirred or agitated for about one-half hour before adding the phenothiazine which is a secondary aromatic amine (and which is sometimes referred to in this specification as a "secondary amine" or as "secondary aromatic amine") using about 1 mole of such secondary amine (phenothiazine) per 1– 1.1 mole of sodium hydride. Addition of the secondary aromatic amine (phenothiazine) to the reaction flask normally results in a small exothermic reaction. Therefore, to assure sufficient control of the reaction it is preferable to keep the reaction mixture's temperature below 100°C. (preferably 60°–70° C.) by adding the secondary aromatic amine slowly, and cooling if necessary. Stirring or similar agitation after adding the secondary amine is required to assure complete reaction (generally for about 2 hours) and the desired aralkyl halide is then added. The mole ratio of aralkyl halide to secondary amine is preferably about 1:1. The reaction temperature should not be allowed to exceed about 100°C. (preferably 60°–70°C.) to assure adequate control; hence, the aralkyl halide is added slowly. This reaction mixture is then stirred to assure substantially complete reaction (about 6 hours at 60°–70°C) and water is added cautiously (dropwise is often necessary) to terminate the reaction.

The reaction mixture (following addition of the water) is a viscous oil. Toluene is added to the viscous oil to form a workable solution and to this solution NaHCO$_3$ is added and the resulting mixture is washed with water until the washings are substantially neutral.

The remaining solvents can be removed under vacuum at about 65°C. The resulting pheneothiazine product which is a tertiary amine is then cooled to 38°C. and poured into a suitable container for future use.

Conversion (one pass yield) by the process described herein is about 90–95 percent of theory and the product has a purity of 96–98 percent.

However, if the process is deviated from, conversion and purity are both noticeably and adversely affected. For example, if the secondary aromatic amine (phenothiazine) is added to the dimethylsulfoxide before the addition of the sodium hydride, the conversion is only 85 percent of theory (or less) and product purity is only 78–90 percent (or less).

EXAMPLE 1

To a reaction flask (4 neck, 3 liter flask equipped with a condenser, stirrer, N$_2$ inlet, thermometer and dropping funnel) containing 1.5 moles of dimethysulfoxide (DMSO) which had been heated to about 60°C. was added 1.1 mole of a 60 percent weight dispersion of sodium hydride in mineral oil. The resulting mixture turned slightly orange.

After all hydrogen evolution had stopped, the reaction mixture was stirred for one-half hour and then 1 mole of a phenothiazine having the formula:

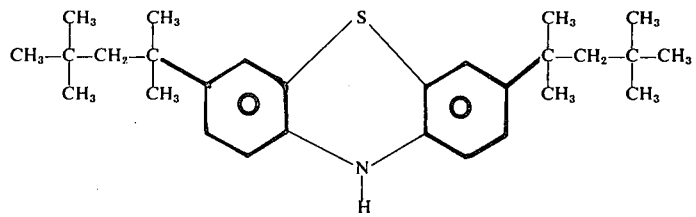

was added to the reaction flask dropwise. The reaction mass was stirred for about 2 hours at 60°C following which 1 mole of benzyl chloride was added dropwise to the reaction flask. The reaction temperature was thereby maintained at about 60°–70°C. Following addition of the benzyl halide the reaction mixture was stirred for 6 hours at a temperature of 60°–70°C. 200 ml. of water was cautiously added dropwise to terminate the reaction.

The resulting viscous oil in the reaction flask was then extracted with 400 ml. of toluene and washed once with 200 ml. of a 10 percent by weight $NaHCO_3$ solution. Said oil was washed several more times with 200 ml. aliquots of water until the washings were neutral. The remaining solvents and volatiles were removed under vacuum at 65°C. The resulting tertiary amine was cooled to 38°C. and poured into a suitable container. Conversion (one pass yield) to the resulting phenothiazine which is a tertiary amine was 90 percent of theory and the product had a purity of about 98 percent. The structure of the phenothiazine which is a tertiary amine product was determined by infrared spectroscopy and nuclear magnetic resonance (NMR) to be N-benzyl-3,7-(1,1,3,3-tetramethylbutyl)-phenothiazine, a phenothiazine (which is a tertiary amine) having the formula:

Product purity was determined by thin layer chromatography, infrared spectroscopy, and melting point.

EXAMPLES 2–16

Examples 2–16 followed the general procedure of Example 1 except that the respective product phenothiazines shown in Table 2 were formed by reacting 3,-7-(1,1,3,3-tetramethylbutyl)-phenothiazine with the respective aralkyl halides shown in Table 2 according to the method of my invention. In each instance conversion was at least 90 percent of theory and the product phenothiazine had a purity of at least 97 percent.

As used herein the term "mole" has its generally accepted meaning; i.e., a mole of substance is that quantity of the substance which contains the same number of molecules of the substance as there are atoms in 12 grams of pure $12_C$.

As used herein the term "percent (%)" means parts per hundred, and the term "parts" means parts by

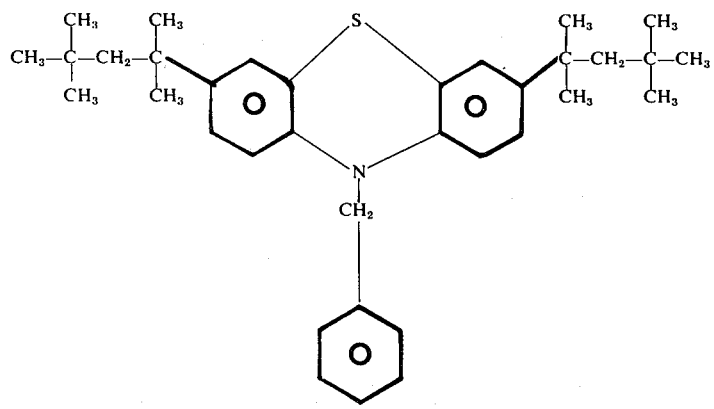

TABLE II

Examples 2–14

| Example | Phenothiazine Product | Phenothiazine Reactant | Aralkyl Halide Reactant |
|---|---|---|---|
| 2 | N-(2-methylbenzyl)-3,7-(1,1,3,3-tetramethylbutyl)-phenothiazine | 3,7-(1,1,3,3-tetramethylbutyl)-phenothiazine | 2-methylbenzyl chloride |
| 3 | N-(4-methylbenzyl)-3,7-(1,1,3,3-tetramethylbutyl)-phenothiazine | '' | 4-methylbenzyl chloride |
| 4 | N-(2-chlorobenzyl)-3,7-(1,1,3,3-tetramethylbutyl)-phenothiazine | '' | 2-chlorobenzyl chloride |
| 5 | N-(4-chlorobenzyl)-3,7-(1,1,3,3-tetramethylbutyl)-phenothiazine | '' | 4-chlorobenzyl chloride |
| 6 | N-(2,4-dichlorobenzyl)-3,7-(1,1,3,3-tetramethylbutyl)-phenothiazine | '' | 2,4-dichlorobenzyl chloride |
| 7 | N-(3,4-dichlorobenzyl)-3,7-(1,1,3,3-tetramethylbutyl)-phenothiazine | '' | 3,4-dichlorobenzyl chloride |
| 8 | N-(α,α-dichlorobenzyl)-3,7-(1,1,3,3-tetramethylbutyl)-phenothiazine | '' | benzotrichloride |
| 9 | N-(2-fluorobenzyl)-3,7-(1,1,3,3-tetramethylbutyl)-phenothiazine | '' | 2-fluorobenzyl chloride |
| 10 | N-(4-fluorobenzyl)-3,7-(1,1,3,3-tetramethylbutyl)-phenothiazine | '' | 4-fluorobenzyl chloride |
| 11 | N-(2-nitrobenzyl)-3,7-(1,1,3,3-tetramethylbutyl)-phenothiazine | '' | 2-nitrobenzyl chloride |
| 12 | N-(4-nitrobenzyl)-3,7-(1,1,3,3-tetramethylbutyl)-phenothiazine | '' | 4-nitrobenzyl chloride |
| 13 | N-(2,2-dimethyl-2-phenylethyl)-3,7-(1,1,3,3-tetramethylbutyl)-phenothiazine | '' | 2,2-dimethyl-2-phenylethyl chloride |
| 14 | N-(2-phenylethyl)-3,7-(1,1,3,3-tetramethylbutyl)-phenothiazine | '' | β-phenylethyl chloride | weight unless otherwise defined where used. Obviously, percent yield or percent conversion is a dimensionless number.

As used herein the term "good yield" (or "high yield") means a conversion (one pass yield) of at least 90 percent of theory, and the term "high quality" ("excellent quality" or "high Purity") means a purity of at least 96 percent.

2,2-dimethyl-2-phenylethyl chloride is

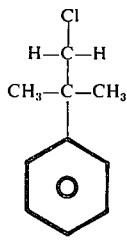

I claim:

1. A process for replacing hydrogen attached to nitrogen in the 10 position of a first phenothiazine with an aralkyl group to form a second phenothiazine having the aralkyl group attached to the nitrogen in the 10 position, the process comprising the following sequential steps:
   a. forming a first mixture by admixing dimethylsulfoxide and an alkali metal hydride while maintaining the temperature of the first mixture below 100°C;
   b. forming a second mixture by admixing the first phenothiazine and the first mixture while maintaining the temperature of the second mixture below 100°C;
   c. forming the second phenothiazine in a third mixture by admixing an aralkyl halide having the formula

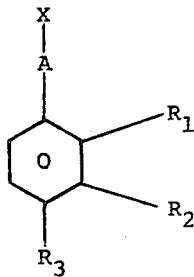

in which (i) X is I, Br, or Cl; (ii) A is Cl$_2$, CBr$_2$, CCl$_2$, or an alkylene group having 1–7 carbon atoms; and (iii) R$_1$, R$_2$, and R$_3$ are separately selected from the group consisting of CH$_3$, C$_2$H$_5$, iodine, bromine, chlorine, fluorine, nitro, and hydrogen with the second mixture while maintaining the temperature of the third mixture below 100°C; and
   d. separating and recovering the second phenothiazine.

2. The process of claim 1 in which the first phenothiazine has the formula

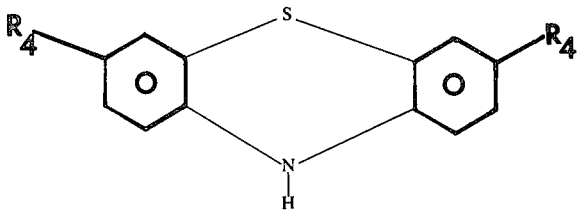

in which R$_4$ is C(CH$_3$)$_2$CH$_2$C(CH$_3$)$_3$.

3. The process of claim 1 in which the second phenothiazine has the formula

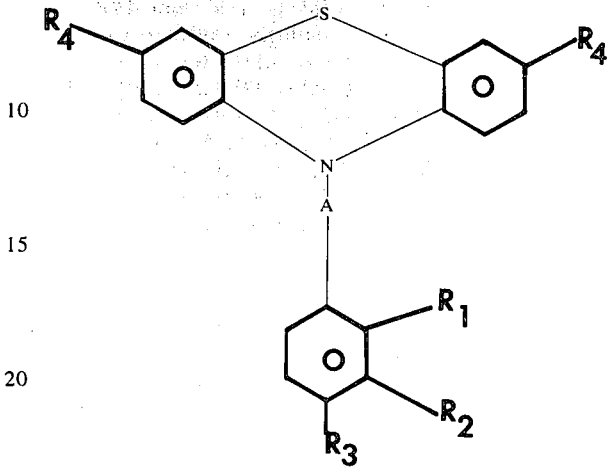

in which R$_1$, R$_2$, and R$_3$ are separately selected from the group consisting of CH$_3$, C$_2$H$_5$, iodine, bromine, chlorine, fluorine, nitro, and hydrogen; A is Cl$_2$, CBr$_2$, CCl$_2$ or an alkylene group having about 1-7 carbon atoms; and R$_4$ is C(CH$_3$)$_3$CH$_2$C(CH$_3$)$_2$.

4. A phenothiazine having the formula

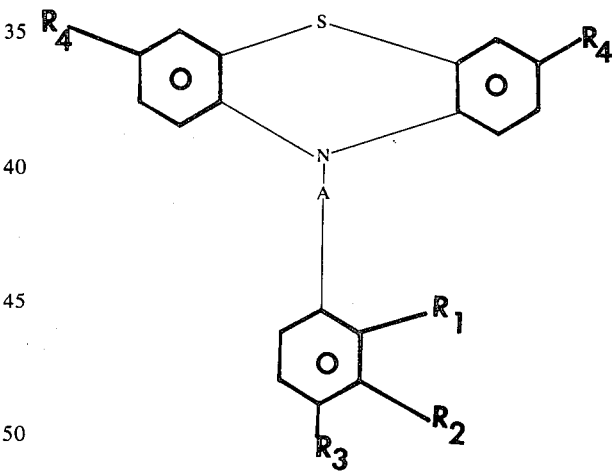

in which R$_4$ is C(CH$_3$)$_3$CH$_2$C(CH$_3$)$_2$; A is an alkylene group having about 1–7 carbon atoms; and R$_1$, R$_2$ and R$_3$ are separately selected from the group consisting of C$_2$H$_5$, iodine, bromine, chlorine, fluorine, nitro, and hydrogen provided that at least one of R$_1$, R$_2$, and R$_3$ is a group member other than hydrogen.

5. The phenothiazine of claim 4 in which R$_1$ is Cl, F, or NO$_2$; R$_2$ and R$_3$ are hydrogen; and A is CH$_2$.

6. The phenothiazine of claim 4 in which R$_3$ is Cl, F, or NO$_2$; R$_1$ and R$_2$ are hydrogen; and A is CH$_2$.

7. The phenothiazine of claim 4 in which R$_2$ and R$_3$ are Cl; R$_1$ is hydrogen; and A is CH$_2$.

8. The phenothiazine of claim 4 in which R$_1$ and R$_3$ are Cl; R$_2$ is hydrogen; and A is CH$_2$.

9. A phenothiazine having the formula

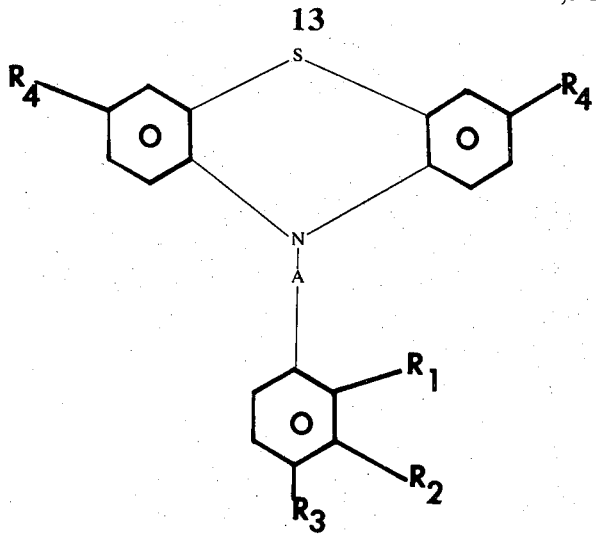

in which $R_1$, $R_2$, and $R_3$ are separately selected from the group consisting of $CH_3$, $C_2H_5$, iodine, bromine, chlorine, fluorine, nitro, and hydrogen; $R_4$ is $C(CH_3)_3CH_2C(CH_3)_2$; and A is $Cl_2$, $CBr_2$, or $CCl_2$.

10. The phenothiazine of claim 9 in which $R_1$, $R_2$, and $R_3$ are hydrogen; and A is $CCl_2$.

11. A phenothiazine having the formula

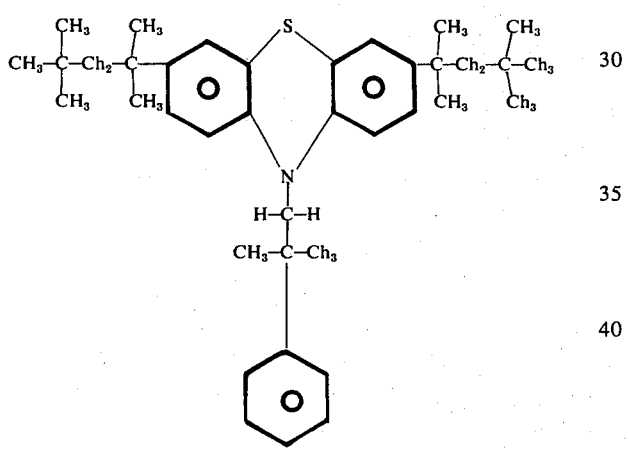

12. A phenothioazine selected from the group consisting of [N-(2-methylbenzyl)-3,7-(1,1,3,3-tetramethylbutyl)-phenothiazine; N-(4-methylbenzyl)-3,7-(1,1,3,3-tetramethylbutyl)-phenothiazine;] N-(2-chlorobenzyl)-3,7-(1,1,3,3-tetramethylbutyl)-phenothiazine; N-(2,4-dichlorobenzyl)-3,7-(1,1,3,3-tetramethylbutyl)-phenothiazine; and N-(3,4-dichlorobenzyl)-3,7-(1,1,3,3-tetramethylbutyl)-phenothiazine.

13. A process for replacing hydrogen attached to nitrogen in the 10 position of a first phenothiazine with an aralkyl group to form a second phenothiazine having the aralkyl group attached to the nitrogen in the 10 position, the process comprising the following sequential steps:

a. forming a first mixture by adding an alkali metal hydride to dimethylsulfoxide having a temperature of about 60°C;

b. forming a second mixture by slowly adding the first phenothiazine to the first mixture while keeping the temperature of the resulting second mixture below 100°C;

c. forming the second phenothiazine in a third mixture by slowly adding an aralkyl halide having the formula

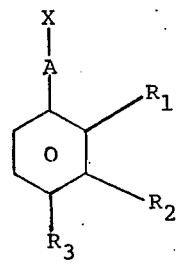

in which (i) X is I, Br, or Cl; (ii) A is $Cl_2$, $CBr_2$, $CCl_2$, or an alkylene group having 1–7 carbon atoms; and (iii) $R_1$, $R_2$, and $R_3$ are separately selected from the group consisting of $CH_3$, $C_2H_5$, iodine, bromine, chlorine, fluorine, nitro, and hydrogen to the second mixture while maintaining the temperature of the resulting third mixture below about 100°C; and d. separating and recovering the second phenothiazine.

* * * * *